United States Patent [19]

Ragle

[11]  4,237,503
[45]  Dec. 2, 1980

[54] SEMI-RIGID MAGNETIC RECORDING DISK MODULE

[75] Inventor: Herbert U. Ragle, Thousand Oaks, Calif.

[73] Assignee: Burroughs Corporation, Detroit, Mich.

[21] Appl. No.: 680

[22] Filed: Jan. 3, 1979

[51] Int. Cl.³ .............................................. G11B 5/016
[52] U.S. Cl. ........................................ 360/99; 360/98
[58] Field of Search .................................. 360/97–99, 360/133, 135

[56] References Cited

U.S. PATENT DOCUMENTS 3,969,767  7/1976  Griffiths et al. ................. 360/102 X

OTHER PUBLICATIONS

IBM/TDB vol. 17, No. 6, Nov. 1974, pp. 1710–1711, "Adjustable Flexible Desk Pack Assembly" by Herring et al.
IBM/TDB vol. 19, No. 11, Apr. 1977, p. 4229, "Disk Stabilization . . ." by Seifert.
IBM/TDB vol. 20, No. 3, Aug. 1977, "Disk Selection . . ." by Kleczkowski et al.

Primary Examiner—John H. Wolff
Attorney, Agent, or Firm—John J. McCormack; Nathan Cass; Kevin R. Peterson

[57] ABSTRACT

In a preferred embodiment, a novel magnetic recording disk module is disclosed, one including a "core" of floppy disks laminated together in abutment, and, on one or both sides of this core, an array of spaced floppy disks, with only the outermost disk adapted for transducing,—especially by a rigid "floppy" type transducer.

17 Claims, 4 Drawing Figures

SEMI-RIGID MAGNETIC RECORDING DISK MODULE

FIELD OF INVENTION

The present invention relates to magnetic disk recording systems and more particularly to those characterized by "flexible" and "semi-flexible" disk media and associated means.

Conventional floppy disks and associated transducers:

As workers in the art know, the magnetic recording arts have developed swiftly since the 1950's and 1960's; when they first became commercially important. Workers in the art are familiar with the features of magnetic disks presently used for data storage, and in particular with the advantages and disadvantages of rigid disks and of "flexible", or "floppy", disks. "Floppies" became commercially significant in the 1970's, offering a low cost medium, with relatively slow "access time" (e.g., as compared with rigid disks which can be rotated much faster). "Flexible disks" can serve as a "unit record" medium that is compact, light, and is readily transported, stored, and handled, interchangably with other like disks—reasons why they are now becoming more widely used for data storage. Workers recognize that costs may be reduced in many cases by replacing a rigid magnetic recording disk with a "floppy" disk, though the fast access and related advantages of rigid disks still make them widely preferable. This invention is intended to reduce the cost of rigid disks by a novel, surprisingly simple and effective employment of flexible media.

Floppy disks can be fashioned from well-known polyester sheet material (e.g., the familiar polyethylene terephthalate used for magnetic tape) with a magnetic coating thereon—this plastic being simply cut into the shape of a circular disk with a central mounting hole to accomodate the familiar drive-spindle. Such a "prior art" floppy disk is well known to workers and is shown and described in U.S. Pat. No. 4,086,640 issued Apr. 25, 1978, commonly assigned and hereby incorporated herein by reference to the extent relevant.

There are certain advantages to using flexible disk files; for instance, they may be operated to be "self-flattening". That is, unlike a rigid disk, a flexible disk, when spun fast enough, will, of itself, flatten-out beautifully, correcting any static warp, etc. Flexible disks can also be "self-aligning". Where spindle misalignment (axis relative to a rigid disk plane) is usually a critical problem with rigid disks—producing troublesome "runout" effects and adding to the complexity and cost of the disk drive (cost of bearings, correction means, etc.)—it is usually not problematical for flexible disks. This is because centrifugal forces created by spinning a flexible disk at high rpm tend to correct any such misalignment. This makes it relatively easy and inexpensive to manufacture a flexible disk pack and the associated drive mechanism, as workers well know. Also, floppy media can be much more "forgiving" in the way it co-acts with a transducer—e.g., allowing the transducer to be positioned at a broad range of spacings—even becoming self-spacing when properly flown over a rigid head-face (see below) as opposed to the fussy, exacting positioning requirements with a rigid disk. According to a feature hereof, such "floppy features" are provided in a "semi-flexible" disk which still retains the fast access time of a rigid disk.

"Floppy packs"; prior art:

Workers are familiar with various ways of assembling a stack of flexible disks. For instance, floppy packs are suggested in U.S. Pat. Nos. 3,130,393 to Gutterman; 3,618,055 to Van Acker, 3,509,533 to Krijan and 3,867,723 to Penfold et al. Various workers have proposed providing radially-apertured, or perforate, spacers between stacked flexible disks to accommodate a disk-separating air flow (e.g., see U.S. Ser. No. 931,057, filed Aug. 4, 1978 for Partition of High Performance Floppy Pack and Associated Means, by Ko Ko Gyi and Herbert U. Ragle, commonly assigned and incorporated herein by reference).

For instance, in U.S. Pat. No. 3,969,767 to Griffiths et al. "spacer-washers" are proposed to separate disks in a disk file. Each "washer" is flexible and has a set of circumferentially-spaced axial projections serving to define ports for the exit of air radially from a central duct, the outward flow passing between adjacent flexible record disks which the spacers support. Such washers are further proposed as including an inner seat and made resilient to allow them to be clamped together and engaged for absorbing and controlling the forces holding the disk pack together. Such an array can be visualized as a laminated tubular "perforate-washer spindle", the semi-rigid washers being stacked to form an air-permeable spindle for coaxially supporting the pack.

Workers contemplating such flexible disk packs have also been concerned over the problems of transducer/-disk engagement. Now, at the high disk rpm contemplated with the invention, the disk must be "flown" over a head surface. It should be recognized that (unlike rigid media) a flexible disk will be compliant to head engagement, but that this compliance will vary with the number of subjacent disks (under the selected disk surface). Thus, as described below an arrangement has been found to accommodate relatively compliant low disk/head engagement, at relatively light loading (e.g., up to about 10–30 grams). Surprisingly, and fortunately, the use of floppy transducer arrangements with such "semi-flexible" disk media has been found to approximate the operation of magnetic tape systems and to afford similar advantages, such as relatively long life for the head and media.

In particular, there are taught semi-flexible disk embodiments including a novel "core" arrangement comprising an array of stacked contiguous "floppy disks" which are made flexible and "self-flattening" under proper high rpm rotation. According to certain other related features the core carries a "mini-pack"0 of floppies, the outermost being apt to be resiliently flown over an associated rigid transducer. Workers will contrast such an arrangement with prior art designs such as those shown in U.S. Pat. No. 3,969,767 to Griffiths, et al. where, for instance, a disk pack is contained between rigid end plates and a different spacer arrangement.

Preferably a fixed spherical-configuration head is preferred, one that is flown-upon by the media, rather than flying upon the media as with a non-rigid head, such as a Winchester head which flys over a rigid disk medium.

Conventional rigid disks and associated transducers:

The typical "Winchester" type transducer now used with rigid disks involves a flexure-mounted, "non-rigid" head, typically of a catamaran or a tri-maran type. It is flown over the rigid medium (rather than being flown over by a flexible media) at a relatively low altitude, typically and under relatively light loading forces (on the order of 10 grams, for example).

Workers in the art of making and using such rigid disks are intensely interested in reducing the cost of the media and of related drives, recording means, etc. This invention satisfies this need, providing a "semi-flexible" magnetic recording disk module adapted for satisfying the performance characteristics of such rigid disks (e.g., high rpm, low access time; for example 3–4000 rpm and about 40–70 milliseconds access time).

Workers familiar with the advantageous characteristics of such floppy disk media and associated rigid transducers would be interested in adapting these characteristics—if such were possible—to disk systems exhibiting the high performance characteristics of rigid disk media. (As opposed to the relatively low rpm, slow access floppy disk media—typically rotated at a few hundred to seven hundred rpm and accessed on the order of several hundred ms. to about 500 or 600 ms.). The invention, rather surprisingly, is adapted to satisfy this objective too.

The invention, as described in the embodiment below involves a novel arrangement of superposed floppy disk stacks—one, control stack, or "core", comprising an abutting array of floppy disks, with a "mini-pack" of spaced floppy disks mounted on one (or both) sides of this "core". In each "mini-pack", the flexible disks are uniformly separated by spacers, with the outermost disk adapted to be recorded-upon by a typical rigid floppy disk transducer, while other floppies are adapted to aid and pneumatically-couple this outer floppy with such transducers in the manner of a pack of rotating floppy disks—this core/mini-pack combination to be rotated at high speeds, on the order of a few thousand rpms or more, for transducing.

The foregoing and other features and objects of advantages according to this invention will be more fully appreciated and become more apparent upon consideration of the following description of preferred embodiments, taken in conjunction with the attached drawings, wherein like reference indicia denote like elements.

BRIEF DESCRIPTION OF THE DRAWINGS

While

DETAILED DESCRIPTION OF PREFERRED EMBODIMENTS

The improved "semi-flexible" disk pack embodiment described here will be understood as advantageously adapted for use in high speed magnetic recording systems characteristic of present-day rigid disk recording and will be better understood from a preliminary consideration of the disk drive indicated in FIG. 2 and described below.

Figure 2:
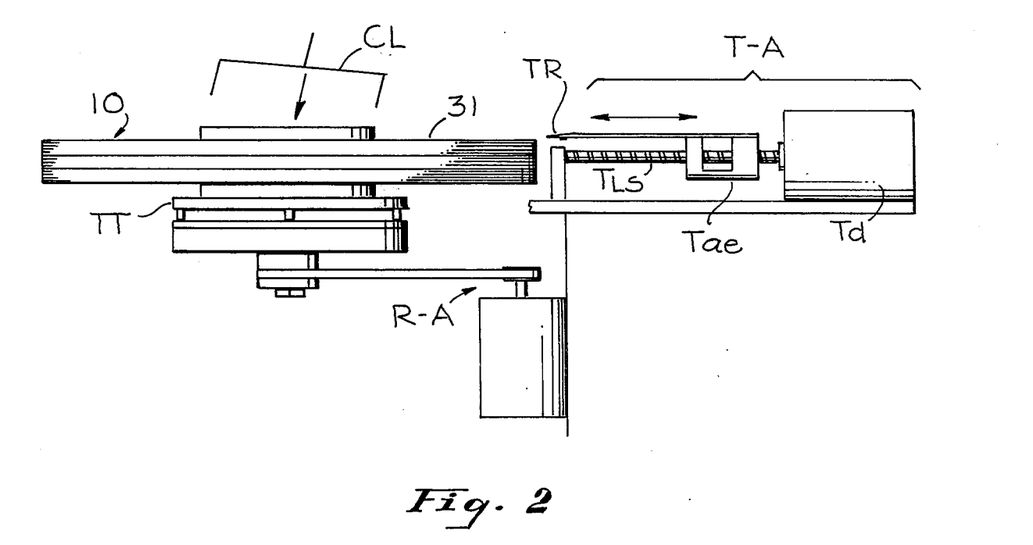
FIG. 2 is a schematic elevation showing such a disk incorporated with rotation and transducer actuator means.

FIG. 2; Illustrative Disk Drive:

An illustrative disk drive is suggested, very schematically, in FIG. 2 (to be understood as a conventional rigid disk drive except as otherwise mentioned). Here, disk module 10 (top face of upper disk 31 thereof) will be understood as to be transduced by the transducer TR, while the module is rotated, at high rpm, on a turntable TT.

The head positioning and control system may be conventional, and thus merely indicated schematically in FIG. 2 by assembly T-A, while turntable TT serves to conventionally engage the module 10 and rotate it (driven by motor R-A, etc.). Transducer TR is part of a transducer assembly T-A. T-A is adapted to reciprocate TR (as indicated by the arrow) radially across (the top of) module 10—preferably along a prescribed constant path, just above the top of the pack. This feature is highly advantageous and may cooperate with the transducer-cushioning mini-pack, as mentioned below. As workers recognize, this allows one to dispense with the usual axial positioning/servo means—a significant step forward!

Details of the transducer and actuating means suggested need not be detailed here since they are well known in the art. Thus, the transducer mount may, surprisingly, be translated along a single access path (plane); alternatively, it may be translated axially (e.g., "slaved" to "follow" hub displacement) to seek registry with the plane of a "selected" disk, as is conventional. Transducer/disk loading will preferably be very light (a few grams).

By way of example only, an actuation drive motor $T_d$ is indicated as coupled to rotate a lead screw $T_{LS}$ on which the head mounting arm is mounted, being threadably engaged therewith via arm-extension $T_{ae}$ for precise translation into the pack (e.g., to access specific tracks on a selected magnetic disk surface, as is well known in the art and need not be detailed here). As described below, workers will recognize that the transducer is preferably suspended on rigid support means adapted to advantageously interact with the flexible-disk cushion (disks 3-a through 3-h) according to the invention (see discussion of compliant head engagement with the disks, bearing upon the recording disk as well as the subjacent dummy disks and inter-disk air films, these bending in compliance therewith).

A "semi-flexible" disk embodiment, intended to afford the performance of such rigid disk units according to the invention will now be described in terms of the preferred embodiment shown in FIGS. 1 and 3.

Figure 1:
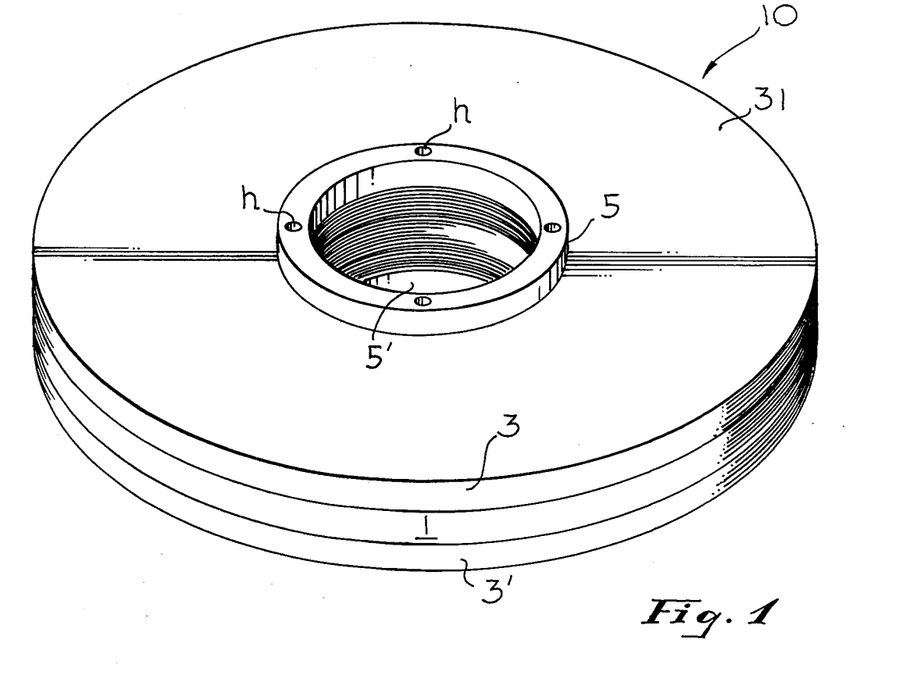
FIG. 1 is a rather schematic upper perspective of a semi-flexible disk embodiment; disk pack being shown in schematic partial side elevation in FIG. 3 and in illustrative operative relation with an associated rigid transducer in the side elevation of FIG. 4.
Figure 3:
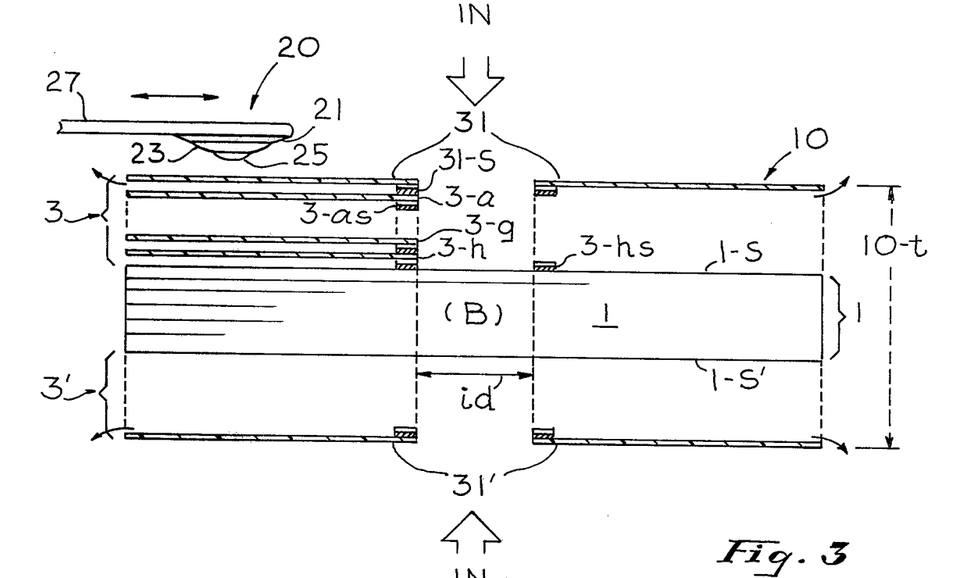

Embodiment of FIGS. 1 and 3:

Accordingly, a "semi-flexible" magnetic recording disk unit 10 is shown in FIGS. 1 and 3 and will be understood as adapted to impart some of the characteristics of floppy disks and associated rigid transducers to arrangements operated as rigid disk media. Pack 10 will be understood as conventionally engaged by a rotation assembly for prescribed high speed rotation (like those for high performance rigid disk arrangements as described above and involving disk rotation on the order of several thousand rpm or more). Disk rotation, transducer operation and associated control means will be understood as provided by conventional means (not shown here). Thus rotation will, however, be effected without interfering with inflow of separation air to the hub, or central bore, of the module 10 [see "IN" arrows in FIG. 3 and "return" of air via spaces between disks 31, 31', 3-a, 3-b, etc.].

Thus disk module 10 will be understood as comprising a "core" 1, of floppy disks, stacked in abutment and unseparated, together with a pair of opposed floppy disk "mini-packs" 3, 3' mounted on the core (while two such packs are shown, only one will be used in the case of single-sided records, as workers will understand). Each mini-pack 3, 3' comprises a group of like flexible recording disks (e.g., preferably of a conventional type, such as 12" diameter, 1.5 mil polyethylene teraphalate) stacked in registry for high speed rotation, being separated uniformly by cylindrical spacers of a known type through which "separation air" is drawn, to provide a prescribed pneumatic cushion (stiffness inversely as a function of separation-distance). Core 1 will be understood as comprised of sufficient abutting disks to provide a relatively rigid, unyielding base, when rotated, and will be understood as presenting, on its opposing sides a relatively flat, hydrodynamically-rigid surface when rotated at the proper high rpm—on the order of several thousand rpm or more as understood in the art.

Thus, each mini-pack 3 (e.g., see FIG. 3) may be understood as comprising an outer flexible recording disk 31 and an array of adjacent supporting flexible disks, or "dummy" disks 3-a to 3-h, for example; with all these disks being separated by spacers (sufficient to accumulate the desired penetration-distance p-d in light of the number of dummies used). This will accommodate a prescribed maximum head entry, e.g., on the order of 10-30 mils for this embodiment, without detracting from the normal flexible disk/head engagement familiar to those in the art of floppy disk recording with stacks of floppy disks.

The "core" and flanking "mini-packs" are all held together in one integral disk unit, or module, by relatively conventional retaining means, such as the collars 5, 5' illustrated and their associated connecting rods (not shown); the rods being threaded through the collars (see four holes h) and intermediate disk and spacers, with all disks and spacers apertured to receive the rods (e.g., as holes h). The central bore defined by the stacked disks (in core and mini-packs) will be understood as conventional (e.g., 2.5" here).

As generally indicated above the entire module 10 is adapted for engagement with an accommodating turntable array; for example, through an engaging seat-fixture formed with (or affixed to) the base collar 5', or otherwise, as known in the art. To this end, the seat may include a set of projecting pillars plus an associated central upset-hub portion configured to accommodate a mating spindle-hub on the turntable, as is well known in the art. And so module 10 may be frictionally engagable upon this turntable via a seating disk, to be held there during rotation and easily removed when desired.

Core 1:

More particularly, core 1 will be here understood as comprising about 40 (the order of 20-50 for such arrays) conventional floppy disks stacked immediately together and held in abutment (e.g., 40 disks, each about 1.5 mils thick, renders a core about 60 mils thick overall)—the core will be understood as adapted, under the contemplated rotational speed (here, about 3000-4000 rpm or more) to present outer surfaces 1-S, 1-S' which are relatively rigid, unyielding and of precise uniform flatness, and precise orientation normal to the axis of rotation—as rotated at high rpm—as known in the art. Of course, when not so rotated (e.g., when left motionless) core 1 will "droop" downward under the influence of gravity. Preferably, this stack of contiguous disks comprise flexible disks identical to the record disks, except that no magnetic coating is needed. Thus, the top and bottom of core 1 should be quite flat in operation, being so rendered by centrifugal forces. Ordinarily, the indicated clamping—pressing the collars against the flexible disk material and spacers—will be adequate to hold the relative position of disks and spacers. Workers will appreciate the unique advantages of such a core—such as its "self-flattening", self-orienting character, low-cost and light weight—especially as compared with conventional rigid disks.

With such a convenient construction the number (thickness) of flexible disks joined to form such a core 1 (by any suitable clamping or adhesive means) will serve to establish the proper degree of rigidity—being sufficiently stiff to hold the pack together (i.e., limit the bending flexure of diverted disks without, itself, bending; and so restraining disks from inordinate whirling and flopping about); yet flexible enough to be "self-flattening" under contemplated operating conditions.

Figure 4:
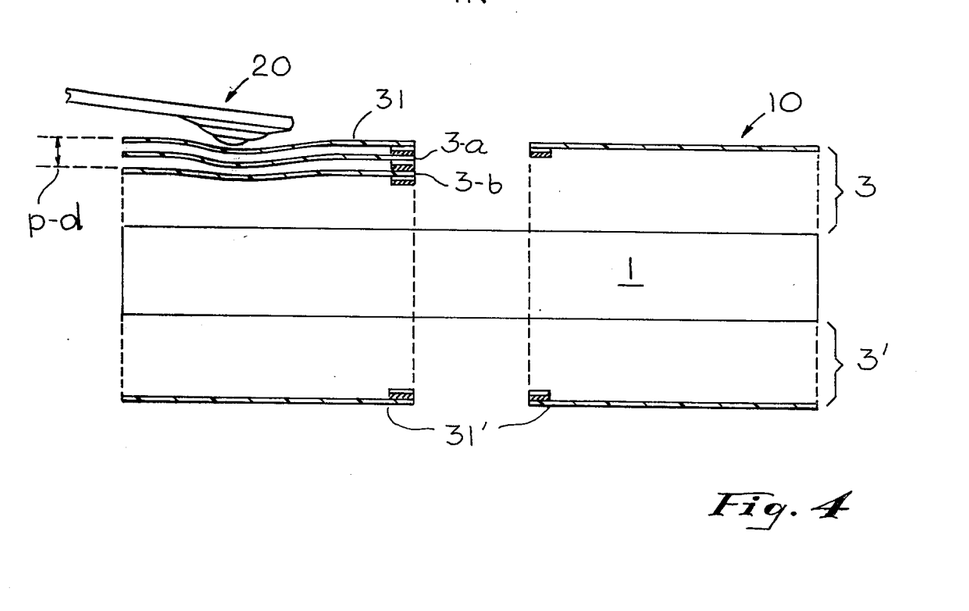

The central bore (B, FIG. 3) or hub channel may be any convenient size, as long as it is adequate (and arranged) to admit sufficient "separation air" to be passed through the spacers S of each "mini-pack" to afford the desired "pneumatic cushion" for a penetrating transducer, as in FIG. 4. Such a bore B will, in certain cases be "self-pumping" when spun up to speed; in others, means will be understood as provided (none shown) to inject sufficient flow of ambient air for each "mini-pack" (top and bottom if two such). Such a means can be an air pump or a pair of self-pumping hub-cylinders, properly vented to suck-in adequate air and including inner conduit means to direct it through the spacers S (e.g., as mentioned in cited U.S. Ser. No. 931,057).

Now, workers will recognize how much trouble and expense is saved by use of such a self-flattening, self-orienting (self-leveling) core—as opposed to a rigid disk which must be painstakingly surface-finished and mounted to achieve this! And what is more surprising: a rigid core structure (e.g., of inexpensive plastic or metal; perhaps hollow) mounted like a rigid disk is practically unable to satisfy this need; for example, if such a structure is bent, dented, or misaligned ever so slightly it will transmit an associated "wrinkle" or "wobble" to the floppy records (31, 31').

"Mini-Packs", 3, 3':

And regarding preferred details of exemplary "mini-pack" (FIGS. 1 and 3) it will be understood the packs 3, 3' are preferably comprised of a set of like flexible recording disks stacked in registry and uniformly separated by like spacers, with the outermost disk, (disk 31 of stack 3) being adapted (coated) for magnetic recording, on its outer face; and with supporting "dummy-disks" being provided to accommodate the resilient engagement of this recording disk 31 with an associated transducer. (A typical rigid floppy disk transducer such as transducer 20 being preferred).

Mini-pack 3 is preferably comprised of about 8-10 floppy disks (1.5 mil each, like those of core 1), stacked to be uniformly separated by spacer-washers (e.g., 5-6 mils thick and made of plastic or like material—and preferably being perforate in the radial direction, of course, to pass "separation-air").

According to this feature, it will be found that the "pneumatic cushion" created by the "spaced dummies" will vary in depth (p-d) with the number and overall thickness of the dummies and spacers, while its stiffness will vary, inversely, with the (uniform) height of the spacers (or inter-dummy space; i.e., to make the head/record encounter zone "stiffer", one need only reduce spacer height). Of course, if the spacers S are "non-breathing" (non-perforate radially), the dummies will collapse together, unseparated, when rotated.

Thus, pack 3 (record 31 plus "dummy" disks 3-a through 3-h) is about 45–70 mils high, sufficient to provide such transducer engagement for a prescribed range of transducer penetration distances (p-d) below the plane of the recording disk (e.g., maximum penetration on the order of 10 to 30 mils contemplated here). For instance, recording disk 31 will be understood as mounted for transduction with the recording face 25 of transducer 20, being separated from the underlying dummy disk 3-a by an associated cylindrical spacer (washer) 31-S, while dummy 3-a is separated from dummy 3-b by a like washer 3-as, and so on through disk 3-h and washer 3-hs.

So, the overall height 10-T of module 10 would be the order of 160–200 mils [i.e., about 0.16–0.2 inches, for dual-side recording—vs. about 110–130 mils for single-side recording, of course—this might be compared with the overall thickness of a typical rigid disk of about 80–90 mils].

Preferred Transducer

As mentioned, it is preferred to use a certain known type "floppy-transducer" with such a "semi-flexible" disk unit, (although virtually any compatible transducer is feasible)—such as the rigid, spherical-face transducer 20 shown in FIGS. 3 and 4 and further described in Ser. No. 909,793, for "Flying Head with Compound Foil", filed on May 26, 1978, by Dean DeMoss and commonly assigned (and incorporated herein by reference). Transducer 20 will be understood as including a spherical recording-face 25 and a related, relatively-flatter spherical engagement face 23, suspended, on a transition surface 21 from actuator arm 27. Such a rigid flying head presents a "compound-foil" face to the passing flexible record segment which is induced to automatically assume a prescribed, relatively controlled "approach zone" and associated constant spacing relative to the head face. Stated otherwise, the combined transducer-stabilizer array is adapted for stabilizing and transducing passing flexible media and includes transducer structure disposed in a prescribed head-foil of given curvature and adapted to mount a transducer structure and to be presented in convex, "air-bearing-generating" relation with passing media—being characterized by a rigidly-fixed mounting foil arranged and adapted to support this head-foil and exhibiting a somewhat flatter convex curvature relative to the passing media so as to create a prescribed "entry zone" air bearing film upstream of the related film generated by said head-foil. Transducer 20 will be understood as moved radially of the recording disk 31 (31' should have its own transducer) under servo-control as known in the art.

However, unlike the "Winchester", or related heads conventional for use on rigid disks, head 20 is relatively "rigid" (i.e., in the direction normal to the recording surfaces, as with other such floppy heads—although the head must be moved from the "rest", or non-recording condition as in FIG. 3 to a "recording" condition whereat it penetrates the associated mini-stack, as indicated schematically in FIG. 4.

Typical Operation of this Embodiment; FIG. 4:

FIG. 4 indicates module 10 of FIGS. 1 and 3 as typically operated for transducing of top record 31 with associated "floppy transducer" 20. Transducer 20 will be understood as located radially above a prescribed track on disk 31; and, with the module 10 spun-up to about 4000 rpm then shifted-in against disk 31 into the "transduce condition", penetrating below the surface recording plane of disk 31 on the order of 10–30 mils, or less, typically (this penetration may be controlled, and varied; e.g., as a function of radial position). Module rotation will, of course, have preestablished the contemplated "pneumatic-cushion" (air flow between dummies 3-a–3-h). As head-face 25 moves in toward disk 31, the disk (along with subjacent, air-separated dummy disks) will, automatically "back-away", being pushed by the head via the intervening air film—with the predetermined transducer-spacing being established once equilibrium is reached. This spacing will be so "self-executing" even though head 20 shifts up or down—e.g., when its support is jostled accidentally. Such a floppy record should be able to "fly" as close—perhaps closer——and in better control, than the more expensive, complex rigid disks and associated Winchester heads. Such control will—surprisingly—yield a comparably-high bit density capability, despite the low cost and simplicity of such an embodiment.

Workers will see that the results achieved with such a "semi-flexible" recording disk module will be comparable to those with a typical rigid disk rotated at several thousand rpm. For instance, access time will be on the order of about 10–50 ms (milliseconds) and yet flexible head-media confrontation still kept, with the head rigid and the disks self-spacing. This would compare, for instance, with an access time of 500 ms or more for a typical floppy disk driven at the characteristic several hundred rpm (about 200 ms is needed just to rotate one revolution).

More particularly, the rigid, spherical-faced floppy transducers of the type here preferred will be understood as rather passively engaging such semi-flexible recording media (the disks being self-spacing, self-orienting and flying over the head—rather than the reverse, as is true for a Winchester head with a rigid disk). By contrast, a Winchester head is subject to all sorts of manufacturing and operational difficulties, including fashioning the usual catamaran (or tri-maran) face, mounting the head delicately on compound flexure means, etc., etc., and exhibits undue "jitter" and instability during its engagement with the rigid medium, with the associated risk of catastrophic wear or a crash against the hard disk face—something virtually unheard-of with an arrangement like the subject embodiment.

Workers will also perceive how relatively inexpensive such a recording module is when compared, for instance, to the typical rigid disk unit. Rigid disks require the use of expensive metals and fussy fabrication techniques, expensive painstaking surface finishing and coating techniques, as well as having much greater mass to be rotated, and involving an ever-present danger that the transducer face will be damaged, and/or data be lost, because of abrasion or crashing of the head against the disk. Also, it is more expensive and difficult to rotate such a rigid disk mass and it is much more difficult and expensive to establish and maintain the intimate head-medium spacing required; whereas with heads and media according to this embodiment the medium becomes "self-spacing" on the transducer, automatically, according to the aerodynamic curvature of the transducer relative to the speed of the passing flexible disk surface.

Alternate embodiment:

Workers will recognize how various features of the invention may be used,—alone and/or together—in other ways. For instance, a number of such modules could be stacked, each with their own head (or pair of heads, e.g., one head for the top and one head for the bottom surface; or several heads for each surface) and the multi-module embodiment operated like a conventional multi-disk array of rigid disks.

Workers in the art will perceive other modes and ways of advantageously using such embodiments according to the invention. For instance, it will be apparent that "semi-flexible" disk modules according to the invention will have special advantages in high shock environments subject to (high G and/or high frequency) shock and vibration loading, for instance, as a recorder mounted in aircraft or a missile, or one mounted adjacent a piece of artillery.

It will be understood that the preferred embodiments described herein are only exemplary, and that the invention is capable of many modifications and variations in construction, arrangement and use without departing from the spirit of the invention.

Further modifications of the invention are also possible. For example, the means and methods disclosed herein may also be applicable to certain other disk recording systems and the like in certain cases. Also, this invention is applicable with other transducer configurations and is useful in other forms of floppy disk recording/reproducing systems.

The above examples of possible variations of the present invention are merely illustrative. Accordingly, the present invention is to be considered as including all possible modifications and variations coming within the scope of the invention as defined by the appended claims.

What is claimed is:

1. An improved floppy disk recording unit including at least one flexible magnetic recording disk characterized by a recording face adapted to "fly" over the aerodynamic face of a prescribed fixedly-held transducer for transduction thereby, the unit also including:
   pneumatic flexible cushion means disposed adjacent each said disk on the side opposite said recording face, this cushion means consisting of a number of spaced flexible dummy-disks similar to said recording disk;
   all disks being separated from one another by a respective annular spacer, each spacer being identical and radially-pervious to a respective air-flow, outward betwen respective disks, cushioningly; and
   a support means disposed operatively adjacent each said cushion means opposite the respective recording disk and adapted to present thereto a "reference surface" of prescribed rigidity, uniform flatness and levelness when co-rotated with the unit at a prescribed, relatively high rotational speed.

2. The combination as recited in claim 1 wherein each transducer is expected to be thrust no more than a prescribed maximum penetration distance (p-d) beyond the rest plane of the associated record disk; wherein each spacer has a height adapted to inject air radially from the hollow unit center so as to exhibit a prescribed hydrodynamic stiffness; and wherein each so-formed cushion means includes sufficient of said so-spaced dummy-disks to render an overall cushion height greater than said penetration distance (p-d).

3. The combination as recited in claim 2 wherein said support means is formed of a stack of abutting flexible disks, sufficient to impart the expected rigidity.

4. The combination as recited in claim 1 wherein said unit includes air-inject means adapted to introduce an air stream centrally of each such cushion means whereby to direct said air flow through each spacer to be projected radially out between the respective flanking disks and thus maintain the pneumatic separation film between all disks; the unit being rotated relatively fast so as to be
   "self-pumping" and automatically to draw-in such isolating air.

5. A method of providing an improved magnetic disk recording unit characterized by at least one flexible recording disk adapted to be confronted and aerodynamically-bent up to a prescribed maximum penetration-distance (p-d) by an associated transducer core-face, this method comprising the steps of:
   stacking a number of flexible dummy-disks like said recording disk together with intermediate radially-apertured separator rings as "pneumatic support means" for each said recording disk and so as to form a "mini-pack" of prescribed height, for each such "mini-pack" these dummy-disks being coupled to the respective recording disk with the inner periphery of the disks retained together to define a common center-bore, and so as to permit the introduction of a separation air flow and resultant separation air-film of prescribed rate between all disks via said rings, the pack being adapted to engage rotation means for high speed rotation thereof, sufficient to render said air-flow;
   providing a support means for each such mini-pack, coupled thereto for co-rotation and adapted to present a relatively rigid, level, uniformly flat reference-surface thereto when so rotated;
   so rotating the unit; and
   providing for delivery of said air flow between said disks.

6. A method of providing novel disc recording media adapted to be rotated at prescribed rotational volocities, this method comprising the steps of:
   providing a "semi-flexible" recording disc unit such as to include 1, or 2, flexible recording discs, with each such recording disc mounted to be pneumatically supported by an associated stack of "dummy" flexible discs; and
   providing core means disposed operatively adjacent each said stack of dummy-discs on the side remote from said recording disc so as to afford a relatively rigid support therefore, at least at said rotational volocities.

7. The method of claim 6, wherein, said core means is provided by stacking a number of flexible discs together abuttingly; and
   arranging for the unit to be spun fast enough to render the upper and lower faces of disc core-stack relatively flat and level.

8. The method of claim 7, wherein enough core discs are so stacked to render said faces thereof adequately rigid.

9. A method of providing novel magnetic recording media for operation at a prescribed minimum rotational speed, this method comprising:

providing a prescribed core means adapted to present a pair of properly-flat, level upper and lower support faces at said rotational speed; and providing 1, or 2, "mini-packs" of spaced flexible discs, each mini-pack mounted to be supported on one of said core support faces; each such mini-pack including an outer recording disc which is remote from said core means and a number of like underlying dummy-discs, with all discs being separated sufficient to afford resiliant deflection of the associated recording disc by a prescribed "deflection distance" upon transducing engagement between a said recording disc and the associated transducer means.

10. The method of claim 9, wherein each said "mini-pack" is arranged and provided to include like spaces of a height sufficient to introduce a prescribed inter-disc air flow and to thereby provide import, a prescribed stiffness to the inter-disc air film; and wherein each "mini-pack" is arranged to further include enough dummy-discs and intervening spacer means to form a stack higher than the prescribed maximum "deflection distance" contemplated for the associated transducer means.

11. The method as recited in claim 10, as operatively combined to render improved magnetic recording and further including the steps of:

rotating the so-formed media as a disc unit at relatively high RPM with a recording surface of each flexible recording disc arranged and adapted to pass a prescribed respective transducing site;

dispossing an associated "floppy-disc transducer" operatively adjacent to each such site; and thrusting the aerodynamically-shaped recording face of each said transducer toward the associated passing recording surface until a prescribed "transduce-spacing" and associated air-film are established, with said dummy discs providing a prescribed "pneumatic resiliancy" for a transducer engagement.

12. A novel "semi-flexible" disc recording media unit adapted to be rotated at prescribed rotational volocities, this unit comprising:

1, or 2, flexible recording discs;

a stack of "dummy" flexible discs disposed with each "dummy" disc in pnuematically-supporting relation with each said recording disc; and core means disposed operatively adjacent the stack of dummy discs so as to afford a relatively rigid support therefore, at least at said rotational volocities.

13. The combination of claim 12, wherein said core means comprises:

a stack of abutting flexible discs arranged and adapted to be spun fast enough to render the upper and lower faces of this core-stack relatively flat and level.

14. The combination of claim 13, wherein enough core discs are so stacked to render said faces thereof adequately rigid.

15. Novel magnetic record media for operation at a prescribed minimum rotational speed comprising:

prescribed core means adapted to present a pair of properly-flat, level upper and lower support faces at said rotational speed; and 1, or 2, "mini-packs" of spaced flexible discs each "mini-pack" mounted to be supported on one of said core support faces, respectively each, such "mini-pack" including an outer recording disc and a number of like underlying dummy-discs supported by one of said core support faces, with all discs being separated sufficient to afford resiliant deflection of the associated recording disc by a prescribed "deflection-distance" upon transducing engagement between a said recording disc and the associated transducer means.

16. The combination of claim 15, wherein each said "mini-pack" is arranged and provided to include like spacers of a height sufficient to introduce a prescribed inter-disc air flow and to thereby provide import a prescribed stiffness to the inter-discs air film; and wherein, each "mini-pack" is arranged to further include enough dummy discs at intervening spacing means to form a stack higher than the prescribed maximum "deflection-distance" contemplated for the associated transducer means.

17. The combination as recited in claim 16 as operatively combined with means to render improved magnetic recording and further including:

means for rotating the so-form media as a disc unit at relatively high RPM with a recording surface of each flexible recording disc arranged and adapted to pass a prescribed respective transducing site; and an associated "floopy-disc transducer" means disposed operatively adjacent each such site;

each transducing means being arranged to thrust an aerodynamically-shaped recording face toward the associated passing recording surface until a prescribed "transduce-spacing" and associative air-film are established, with said dummy-discs the while providing a prescribed "pnuematic-resilancy" for transducer engagement.

* * * * *

UNITED STATES PATENT AND TRADEMARK OFFICE
CERTIFICATE OF CORRECTION

PATENT NO. : 4,237,503
DATED : December 2, 1980
INVENTOR(S) : Herbert U. Ragle

It is certified that error appears in the above—identified patent and that said Letters Patent is hereby corrected as shown below:

Column 2, line 53, delete "O".

Column 9, line 57, "betwen" should read -- between --.

Signed and Sealed this

Twenty-eighth Day of April 1981

[SEAL]

*Attest:*

RENE D. TEGTMEYER

*Attesting Officer*    *Acting Commissioner of Patents and Trademarks*

UNITED STATES PATENT AND TRADEMARK OFFICE
CERTIFICATE OF CORRECTION

PATENT NO. : 4,237,503

DATED : December 2, 1980

INVENTOR(S) : Herbert Underwood Ragle

It is certified that error appears in the above—identified patent and that said Letters Patent is hereby corrected as shown below:

Column 11, line 23, "import," should be deleted.

Signed and Sealed this

Sixteenth Day of June 1981

[SEAL]

Attest:

RENE D. TEGTMEYER

Attesting Officer

Acting Commissioner of Patents and Trademarks